US012794819B2

(12) United States Patent
Yu et al.

(10) Patent No.: US 12,794,819 B2
(45) Date of Patent: Nov. 10, 2026

(54) ADJUSTMENT OF CONTENTION WINDOW SIZE FOR COMMUNICATION IN AN UNLICENSED BAND

(71) Applicant: Nokia Technologies Oy, Espoo (FI)

(72) Inventors: Ling Yu, Kauniainen (FI); Torsten Wildschek, Gloucester (GB); Nuno Manuel Kiilerich Pratas, Gistrup (DK); Vinh Van Phan, Oulu (FI); Yong Liu, Shanghai (CN); Tao Tao, Shanghai (CN); Naizheng Zheng, Beijing (CN)

(73) Assignee: Nokia Technologies Oy, Espoo (FI)

( * ) Notice: Subject to any disclaimer, the term of this patent is extended or adjusted under 35 U.S.C. 154(b) by 319 days.

(21) Appl. No.: 18/717,520

(22) PCT Filed: Dec. 9, 2021

(86) PCT No.: PCT/CN2021/136924
§ 371 (c)(1),
(2) Date: Jun. 7, 2024

(87) PCT Pub. No.: WO2023/102864
PCT Pub. Date: Jun. 15, 2023

(65) Prior Publication Data

US 2025/0047614 A1 Feb. 6, 2025

(51) Int. Cl.
*H04L 47/27* (2022.01)
*H04W 74/0816* (2024.01)

(52) U.S. Cl.
CPC ......... *H04L 47/27* (2013.01); *H04W 74/0816* (2013.01)

(58) Field of Classification Search
CPC ........................... H04L 47/27; H04W 74/0816
See application file for complete search history.

(56) References Cited

U.S. PATENT DOCUMENTS

2017/0094546 A1 3/2017 Chai et al.
2018/0124828 A1 5/2018 Kim et al.
(Continued)

FOREIGN PATENT DOCUMENTS

CN 108966360 A 12/2018
WO 2014/036896 A1 3/2014
(Continued)

OTHER PUBLICATIONS

Office action received for corresponding Chinese Patent Application No. 202180041427.4, dated Feb. 27, 2026, 6 pages of office action and 7 pages of translation/summary available.
(Continued)

*Primary Examiner* — Faruk Hamza
*Assistant Examiner* — Tito Q Pham
(74) *Attorney, Agent, or Firm* — Barta Jones, PLLC

(57) ABSTRACT

Example embodiments of the present disclosure relate to a device, method, apparatus and computer readable storage medium for hybrid automatic repeat request (HARQ) feedback for adjustment of contention window size for communication in an unlicensed band. In example embodiments, if it is determined that a failure of transmission in an unlicensed occurs, the device determines a cause of the failure of the transmission is determined based on received information associated with a transmission collision. Then, the device adjusts a size of a contention window for a listen-before-talk procedure.

20 Claims, 7 Drawing Sheets

(56) References Cited

U.S. PATENT DOCUMENTS

| | | | | |
|---|---|---|---|---|
| 2018/0175975 | A1 | 6/2018 | Um et al. | |
| 2018/0343205 | A1* | 11/2018 | Lei | H04L 1/1887 |
| 2019/0007972 | A1* | 1/2019 | Gou | H04L 47/27 |
| 2020/0100284 | A1* | 3/2020 | Li | H04L 1/1812 |
| 2021/0219283 | A1 | 7/2021 | Xue et al. | |
| 2021/0360673 | A1* | 11/2021 | Myung | H04L 1/18 |
| 2022/0085924 | A1* | 3/2022 | Talarico | H04L 1/1812 |
| 2022/0129286 | A1* | 4/2022 | Zhang | G06F 9/3555 |
| 2022/0232625 | A1* | 7/2022 | Liu | H04L 1/187 |
| 2022/0279584 | A1* | 9/2022 | Zhu | H04L 1/1621 |
| 2024/0406982 | A1* | 12/2024 | Ganesan | H04L 1/1812 |

FOREIGN PATENT DOCUMENTS

| | | | |
|---|---|---|---|
| WO | 2015/187860 | A1 | 12/2015 |
| WO | 2020/060370 | A1 | 3/2020 |
| WO | 2020/125121 | A1 | 6/2020 |
| WO | 2021/179114 | A1 | 9/2021 |

OTHER PUBLICATIONS

"IEEE 802.11", Wikipedia, Retrieved on Jul. 31, 2025, Webpage available at: https://en.wikipedia.org/wiki/IEEE 802.11.

"3rd Generation Partnership Project; Technical Specification Group Radio Access Network; Physical layer procedures for shared spectrum channel access (Release 16)", 3GPP TS 37.213 V16.6.0, Jun. 2021, pp. 1-27.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.6.0, Jun. 2021, pp. 1-391.

"3rd Generation Partnership Project; Technical Specification Group Radio Access Network; NR; NR and NG-RAN Overall Description; Stage 2", 3GPP TS 38.300, V16.7.0, Sep. 2021, pp. 1-152.

"WID revision: NR sidelink enhancement", 3GPP TSG RAN Meeting #90e, RP-202846, LG Electronics, Agenda Item: 9.8.3, Dec. 7-11, 2020, 6 pages.

International Search Report and Written Opinion received for corresponding Patent Cooperation Treaty Application No. PCT/CN2021/136924, dated Sep. 7, 2022, 9 pages.

"Contention window size adjustments", 3GPP TSG RAN WG1 Meeting #84, R1-160676, Sony, Agenda item: 7.3.1.5, Feb. 15-19, 2016, 2 pages.

Extended European Search Report received for corresponding European Patent Application No. 21966786.2, dated Apr. 15, 2025, 13 pages.

"Remaining details of CWS adjustment based on HARQ-ACK feedback", 3GPP TSG RAN WG1 Meeting #83, R1-157099, ETRI, Agenda item: 6.2.3.1, Nov. 15-22, 2015, 5 pages.

"Discussion on methods for CW sizes adjustments", 3GPP TSG RAN WG1 Meeting #82bis, R1-155187, CATT, Agenda Item: 7.2.3.1, Oct. 5-9, 2015, 2 pages.

Office action received for corresponding Chinese Patent Application No. 202180041427.4, dated Aug. 30, 2025, 6 pages of office action and 6 pages of translation available.

* cited by examiner

ADJUSTMENT OF CONTENTION WINDOW SIZE FOR COMMUNICATION IN AN UNLICENSED BAND

FIELD

Example embodiments of the present disclosure generally relate to the field of communications, and in particular, to methods, apparatuses and computer readable storage media for adjustment of contention window size (CWS) for communication in an unlicensed band.

BACKGROUND

In telecommunications networks, such as Long Term Evolution (LTE) networks or Next Generation 5G networks, sidelink communications between user equipment (UEs) over a ProSe Communication 5 (PC5) wireless interface may be supported. In sidelink communications, UEs may communicate with each other directly via a PC5 wireless interface on a sidelink channel. Further, sidelink communications may obtain a plurality of benefits, such as coverage extension, service reliability enhancement, and potential low latency.

Especially, unlicensed technologies may need to abide to the conformance requirement of regulations such as a listen-before-talk (LBT) regulation so as to ensure existence fairness with other UEs in the shared unlicensed spectrum, for example UEs using a wireless fidelity (WiFi) mechanism. In a LBT procedure, prior to transmission, the transmitting (Tx) UE performs LBT operation in a contention window, and the UE can perform transmission only if the channel is detected to be free for an entire duration of the contention window. Then, the Tx UE is aware of a reception status at the receiving UE based on the hybrid automatic repeat request, HARQ, feedback to determine the need of sidelink retransmission. If NACK feedback is received, the Tx UE may accordingly adjust a size of the contention window before the sidelink retransmission to further ensure existence fairness with other UEs in the shared unlicensed spectrum. Thus, the adjustment of the size of the contention window is an important issue for communications in the shared unlicensed spectrum.

SUMMARY

In general, example embodiments of the present disclosure provide devices, methods, apparatuses and computer readable storage media for adjustment of CWS for communication in an unlicensed band.

In a first aspect, a device is provided which comprises at least one processor and at least one memory including computer program code. The at least one memory and the computer program code are configured to, with the at least one processor, cause the device to determine occurrence of a failure of transmission in an unlicensed band. Further, the device is caused to determine a cause of the failure of the transmission based on received information associated with a transmission collision. Moreover, the device is caused to adjust, based on the cause of the failure of the transmission, a size of a contention window for a listen-before-talk procedure.

In a second aspect, a method is provided. In the method, occurrence of a failure of transmission in an unlicensed band is determined. Moreover, a cause of the failure of the transmission based on received information associated with a transmission collision is determined. Further, a size of a contention window for a listen-before-talk procedure is adjusted based on the cause of the failure of the transmission.

In a third aspect, there is provided an apparatus comprising means for performing the method according to the second aspect.

In a fourth aspect, there is provided a computer readable storage medium comprising program instructions stored thereon. The instructions, when executed by a processor of a device, cause the device to perform the method according to the second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
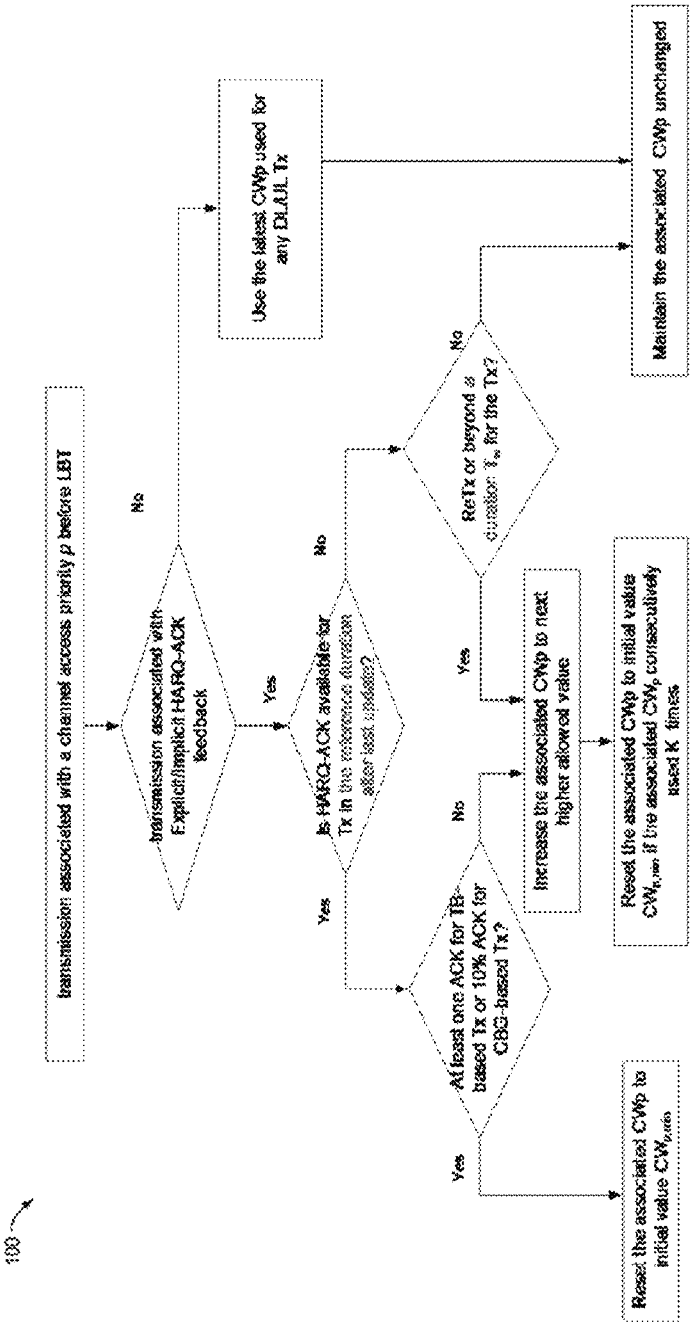
FIG. 1 shows CWS adjustment procedure in a new radio-unlicensed (NR-U) band.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "terminal device" or "user equipment" refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station or another UE on predetermined schedules, when triggered by an internal or external event, or in response to requests from the network side or the other UE side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

FIG. 1 shows CWS adjustment procedure in a NR-U band. As shown in FIG. 1, if the transmissions of the gNB are on a physical downlink share channel (PDSCH) associated with channel access priority class p, the gNB maintains the CWS $CW_p$ and adjusts $CW_p$ before step 1) of the contention window adjustment procedure for those transmissions using the following steps:

Step 1) For every priority class $p \in \{1,2,3,4\}$, set $CW_p = CW_{min,p}$.

Step 2) If hybrid automatic repeat request (HARQ) acknowledgement (ACK) feedback is available after the last update of $CW_p$, go to step 3. Otherwise, if the transmission of the gNB does not include a retransmission or is transmitted within a duration $T_w$ from the end of the reference duration corresponding to the earliest DL channel occupancy after the last update of $CW_p$, go to step 5: otherwise go to step 4.

Step 3) The HARQ-ACK feedback(s) corresponding to the PDSCH(s) in the reference duration for the latest DL channel occupancy for which HARQ-ACK feedback is available is used as follows: If at least one HARQ-ACK feedback is ACK for PDSCH(s) with transport block based feedback or at least 10% of HARQ-ACK feedbacks is ACK for PDSCH code block groups (CBGs) transmitted at least partially on the channel with code block group based feedback, go to step 1: otherwise go to step 4.

Step 4) Increase $CW_p$ for every priority class $p \in \{1,2,3,4\}$ to the next higher allowed value.

Step 5) For every priority class $p \in \{1,2,3,4\}$, maintain $CW_p$ as it is: go to step 2.

The reference duration and duration $T_w$ as mentioned in the procedure above are defined as follows. The reference duration corresponding to a channel occupancy initiated by the gNB including transmission of PDSCH(s) is defined as a duration starting from the beginning of the channel occupancy until the end of the first slot where at least one unicast PDSCH is transmitted over all the resources allocated for the PDSCH, or until the end of the first transmission burst by the gNB that contains unicast PDSCH(s) transmitted over all the resources allocated for the PDSCH, whichever occurs earlier. If the channel occupancy includes a unicast PDSCH, but it does not include any unicast PDSCH transmitted over all the resources allocated for that PDSCH, then, the duration of the first transmission burst by the gNB within the channel occupancy that contains unicast PDSCH(s) is the reference duration for CWS adjustment. The duration $T_w$ can be defined as follows: $T_w = \max(T_A, T_B + 1\text{ ms})$, where the $T_B$ is a duration of the transmission burst from the start of the reference duration and $T_A = 5$ ms, if the absence of any other technology sharing the channel can't be guaranteed on a long-term basis, for example by level of regulation. Otherwise, $T_A = 10$ ms.

In a NR-U band, the CW adjustment scheme is implemented with the goal of minimizing inter-system collisions in an unlicensed band, that is, collisions between a NR-U system and a WiFi system. In the CW adjustment scheme, the CWS is increased if the occurrence of a collision is detected, for example, based on HARQ feedback, and the CWS is reset to the minimum CWS value whenever the transmission succeeds based on the HARQ feedback. That is, in this CW adjustment scheme for NR-U band, the occurrence of a collision with inter-system users is assumed to be detected according to the received HARQ feedback, which in turn can trigger the CWS adjustment.

Likewise, in a WiFi system, the CW adjustment mechanism is also introduced to derive a back-off time to be applied before a Wi-Fi node can perform its transmission. The main aim of this mechanism is to avoid collisions between Wi-Fi nodes. In the WiFi system, the CW is initially set to a minimum value CWmin and is doubled whenever a collision happens. After successful transmission without collision or when a maximum CW value CWmax is reached, the CW is reset to CWmin.

As stated above, sidelink communications between UEs over PC5, as described in for example, TS 36.300 for LTE and TS 38.300 for NR, are based on the principle of one-to-many broadcast oriented by a transmitting (Tx) UE. In NR sidelink, it supports all cast types: unicast, groupcast or broadcast.

There are two modes of resource allocation, referred to as Mode 1 and Mode 2, specified for sidelink transmission. Mode 1 refers to utilization of the scheduled resources or grants from a serving base station. This implies that the Tx UE is in a RRC CONNECTED state of the serving base station in order to get resources allocated in Mode 1. Mode 2 refers to utilization of autonomous allocation or selection of resources from (pre-) configured Tx resource pool(s) by Tx UE. The resource selection in Mode 2 can be based on a simple random selection or sensing-based selection including full sensing or partial sensing for power saving. Mode 2 can be used for Tx UE in coverage (IC) or out-of-coverage (OoC) in RRC CONNECTED, RRC IDLE, or RRC INACTIVE without the need of coordination on resource allocation from the base station. However, resources selection collision from different Tx UEs in proximity may happen in sidelink RA mode 2 especially in high density scenario.

In NR sidelink unicast and groupcast, HARQ feedback based sidelink retransmission is designed such that the Tx UE can be aware of the reception status at the Receiving (Rx) UEs to determine the need of sidelink retransmission as stated above. In addition, NR sidelink also support blind retransmission without need of HARQ feedback. The Tx UE may indicate the need of HARQ feedback in the 2nd stage of sidelink control information (SCI). For sidelink groupcast, two options of HARQ feedback are supported as follows:

For example, a sidelink Rx UE within a range of the Tx UE sends non-acknowledgement (NACK) feedback if it successfully decodes the SCI but fails to decode the data payload. Otherwise, the sidelink Rx UE will not transmit any feedback. The sidelink Rx UE sending NACK feedback will use a common/shared physical sidelink shared channel (PSFCH) resource.

Alternatively, a sidelink Rx UE sends ACK if it successfully decode the SCI and data payload received from the physical sidelink control channel (PSCCH) and physical sidelink shared channel (PSSCH) respectively. The sidelink Rx UE sends NACK if it successfully decodes the SCI but fails to decode the data payload. The sidelink Rx UE sends nothing if it fails to detect or decode the SCI. The sidelink Rx UEs sends its feedback over a dedicate PSFCH resource.

Recently, inter-UE coordination (IUC) information is discussed, for example, in the ongoing 3GPP Release (Rel) 17, for resource allocation enhancement especially for resource allocation mode 2 in order to enhance reliability and reduce latency. It has been agreed that a set of resources is determined at a UE, which can be sent to another UE in mode 2. Then, the other UE takes this into account in the resource selection for its own transmission. The scheme can be applicable to operate in-coverage, partial coverage, and out-of-coverage and address consecutive packet loss in all coverage scenarios.

Further, for IUC in Mode 2, it has been agreed in the third generation partnership project (3GPP) that the IUC may comprise preferred and/or non-preferred resources for the SL transmission of the Tx UE. Alternatively, the IUC may comprise the presence of expected/potential resource conflict on the resources determined from the SCI indicated by the Tx UE.

As stated above, In the WiFi system, the CWS adjustment scheme is based on the principle that a reception failure is due to collisions with other WiFi nodes and therefore the CWS adjustment serves as a distributed channel access load balancing mechanism as there is no central resource coordination. In a NR-U system, the CWS adjustment serves primarily as an inter-system channel access load balancing mechanism, that is, between a WiFi system and a NR-U system. Since NR-U transmission is under control of a base station, there is no intra-system transmission collision. In other words, the CWS adjustment mechanism in NR-U is purely for channel coexistence with a WiFi system.

While in sidelink, it is expected that collisions among intra-system UEs can occur when the sidelink UEs autonomously select sidelink communication resources from (pre-) configured resource pool if the sidelink UEs operate in RA mode 2, as described above. Therefore, when HARQ-NACK is fed back from a sidelink Rx UE, it is required to determine whether this failure of the sidelink transmission is due to a collision within the sidelink system or a inter-system collision with another system, for example, a WiFi system. Considering that the intra-system transmission collision can be dealt with using the existing sidelink mechanisms, mainly the inter-system collision should be dealt via the CWS adjustment mechanism. Therefore, how to differentiate between intra-system transmission collision and inter-system collision is an important problem to be solved regarding to CWS adjustment for sidelink transmission in an unlicensed band.

Embodiments of the present disclosure provide a new scheme of adjustment of CWS for sidelink communication in an unlicensed band. In this scheme, occurrence of a failure of transmission in an unlicensed band is determined. Then, a cause of the failure of the transmission is determined based on received information associated with the transmission collision. For example, received information associated with the transmission collision may comprises an indication for occurrence of an intra-system transmission collision of a previous transmission in the unlicensed band, a plurality of indications for a plurality of potential intra-system transmission collisions in the unlicensed band, one or more indications of non-preferred resources associated with the transmissions in the unlicensed band, and/or an indication for occurrence of an inter-system transmission collision of a previous transmission in the unlicensed band. Further, a size of a contention window for a listen-before-talk procedure is adjusted based on the cause of the failure of the transmission. For example, the size of contention window may be maintained or decreased if the failure of the transmission is caused by an intra-system transmission collision in the unlicensed band. The size of contention window may be increased if the failure of the transmission is caused by an inter-system transmission collision in the unlicensed band.

This scheme may achieve accurate determination of the cause of the failure of the transmission to facilitate a right decision of CWS adjustment. Thus, communication quality and transmission efficiency may be improved, and resource overhead may be saved.

Figure 2:
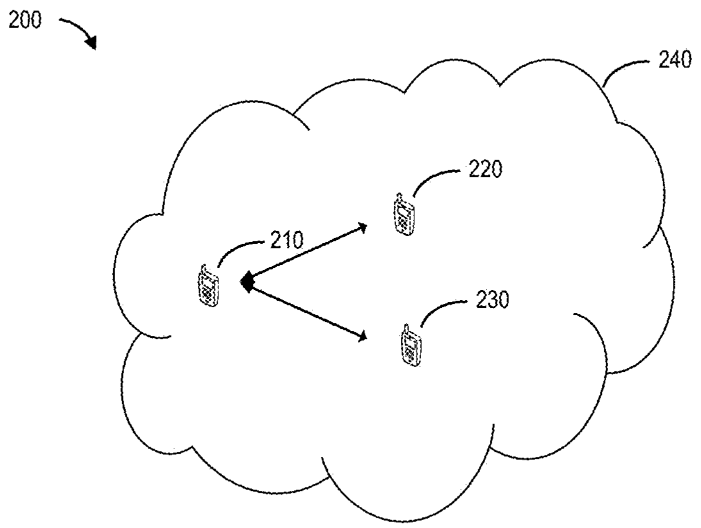
FIG. 2 shows a simplified block diagram of an environment in which embodiments of the present disclosure may be implemented.

FIG. 2 shows an example environment 200 in which example embodiments of the present disclosure can be implemented.

The environment 200, which may be a part of a communication network, comprises devices 210, 220 and 230 in a system 240. As an example, the device 210 may communicate with the devices 220 and 230 or with other devices via the devices 220 and 230.

The devices 210, 220 and 230 may be implemented by any suitable devices in the communication network. In some example embodiments, some of the devices 210, 220 and 230 may be implemented by one or more terminal device and the others may be implemented by one or more network devices, or vice versa. In some other example embodiments, the devices 210, 220 and 230 may be all implemented by terminal devices or network devices.

According to some embodiments of the present disclosure, in the environment 200, the system 240 may be a sidelink system and the devices 210, 220 and 230 can perform sidelink communications. In these some embodiments, the devices 210, 220 and 230 may be implemented by terminal devices or UEs. Just for the purpose of discussion, in some example embodiments, the device 210 will be taken as an example of a Tx device that initiate sidelink transmission. The device 220 will be taken as an example of a Rx device of the sidelink transmission. The device 230 will be taken as an example of a third device.

It is to be understood that three devices are shown in the environment 200 only for the purpose of illustration, without suggesting any limitation to the scope of the present disclosure. In some example embodiments, the environment 200 may comprise one or more further devices to communicate with the device 210.

The communications in the environment 200 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio (NR-U) technologies.

The device 210 may perform a LBT procedure in the contention window before initiating sidelink transmission to the device 220. The device 210 can initiate the sidelink transmission only if the channel is detected to be free for the entire duration of the contention window.

For example, in a sub-7 GHz unlicensed band, the coexistence of a NR system with other systems is ensured via a LBT channel access mechanism. That is, to pass an LBT check, the device 210 must observe the channel as available for a number of consecutive Clear Channel Assessment (CCA) slots. In the sub-7 GHz unlicensed bands, the duration of these CCA slots is 9 μs. The device 210 considers the channel as available in a CCA slot if the measured power, that is, the collected energy during the CCA slot, is below a regulatory specified power threshold which may depends on the operating band and the geographical region.

Figure 3:
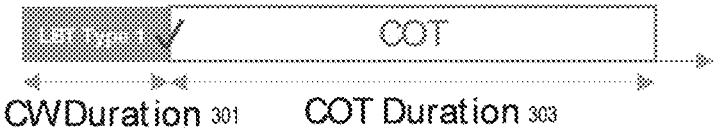
FIG. 3 shows acquisition of channel occupancy time (COT) via LBT Type 1.

FIG. 3 shows acquisition of COT by the device 210 via LBT Type 1. For the purpose of discussion, FIG. 3 will be described with reference to FIG. 2. As shown in FIG. 3, when the device 210 initiates the communication, it has to acquire permission to access the channel for a certain period of time referred to as COT, by applying an "extended" LBT procedure where the channel must be deemed as free for the entire duration 301 of a contention window (CW). This "extended" LBT procedure is commonly known as channel access Type 1, for example as specified in a Technical Specification (TS) 37.213.

The duration 301 of the CW and the duration 303 of the COT depend on a channel access priority class (CAPC) associated with the traffic of the transmitting UE, as shown in the following Table 1. Control plane traffic is transmitted with p=1, while user plane traffic is transmitted with p>1. In the Table 1, the channel access Type 1 are depicted for a UE-universal terrestrial radio access network (Uu) uplink (UL) case. In the Table 1, the contention window length in CCA slots associated with each CAPC has a minimum ($CW_{min,p}$) and maximum ($CW_{max,p}$). The duration of the COT is given by $T_{ulm\ cot,p}$. The channel access Type 1 parameters for downlink (DL) transmission could be adopted in sidelink transmission.

TABLE 1

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:

For p = 3, 4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.

NOTE 2:

When $T_{ulm\ cot,p}$ = 6 ms it may be increased to 8 ms by inserting one or more gaps. The minimum duration of a gap shall be 100 us. The maximum duration before including any such gap shall be 6 ms.

However, considering that NR-U transmission is under control of a base station, there is no intra-system transmission collision. The CWS adjustment mechanism in NR-U described as above is purely for channel coexistence with a WiFi system. In sidelink transmission, intra-system transmission collision may occur for example if RA mode 2 is adopted. Thus, there is a need for a scheme to adjust CWS considering not only the inter-system collision, but also the inter-system collision.

According to some example embodiments of the present disclosure, the device 210 initiates transmission to the device 220. Further, the device 210 determines occurrence of a failure of transmission in an unlicensed band. For example, the failure of the transmission may be caused by a collision within the system 240. As another example, the failure of the transmission may be caused by a collision between the system 340 and a further system, for example, a WiFi system. Then, the device 210 determines a cause of the failure of the transmission based on received information associated with a transmission collision. Further, the device 210 adjusts a size of a contention window for a listen-before-talk procedure based on the cause of the failure of the transmission.

Detailed processes for adjustment of CWS for communication in an unlicensed band will be discussed in the following with reference to FIGS. 4-6.

Figure 4:
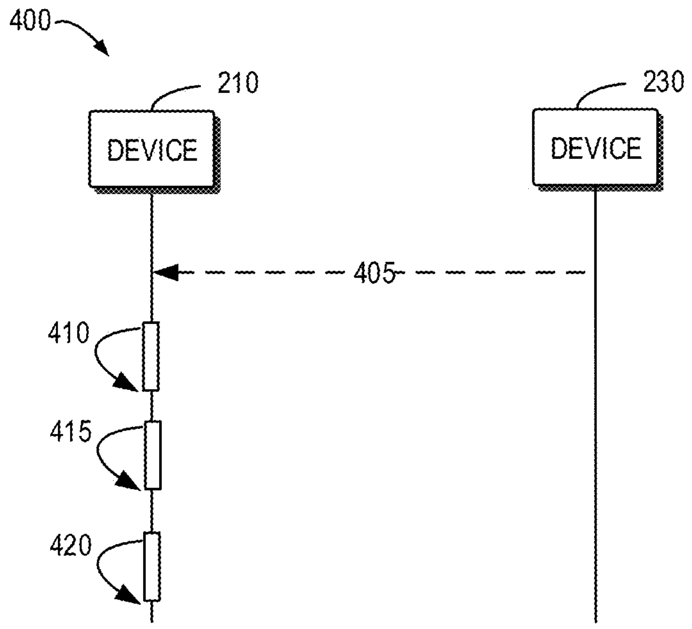
FIG. 4 shows a signaling flow between devices according to some example embodiments of the present disclosure.

Reference is first made to FIG. 4 which shows a signaling flow 400 between the devices according to some example embodiments of the present disclosure. For the purpose of discussion, the signaling flow 400 will be described with reference to FIG. 2.

As shown in FIG. 4, in some example embodiments, the device 210 may receive (405) from the device 230 information associated with the transmission collision. Further, the device 210 may receive further information associated with the transmission collision from the device 220 or a further device in the sidelink system. In some example embodiments, the information associated with the transmission collision may comprise Inter-UE Coordination (IUC) information. The cause of the failure of the transmission may be determined implicitly or explicitly based on the information associated with the transmission collision. In some example embodiments, the information associated with the transmission collision may comprise assistance information for implicitly determining the cause of the failure of the transmission. In some other example embodiments, the information associated with the transmission collision may comprise the cause of the failure of the transmission for explicitly determining the cause of the failure of the transmission.

For example, the information associated with the transmission collision may be determined e.g. by the device 220 or the device 230, based on SCI sensing and/or energy sensing. In some example embodiments, the resources used by the device 210 for transmission may be determined based on the SCI from the device 210. As an example, an intra-system transmission collision may be determined to occur, if it is detected that a further device uses the same resources as the device 210 based on the SCI. As another example, an inter-system collision may be determined to occur, if it is detected that no further device use the same resources as the device 210 based on the SCI, while strong interference on the resources is detected by energy sensing. Thus, the information associated with the transmission collision may comprise indications made based on determination of occurrence of the intra-system transmission collision or inter-system collision.

In some example embodiments, the device 210 may detect information associated with the transmission collision. Then, the device 210 may determine the collision situation in the system based on received information associated with a transmission collision. For example, the information associated with the transmission collision may comprise an indication for occurrence of an intra-system transmission collision of a previous transmission in the unlicensed band. As another example, the information associated with the transmission collision may comprise a plurality of indications for a plurality of potential intra-system transmission collisions in the unlicensed band. As yet an example, the information associated with the transmission collision may comprise one or more indications of non-preferred resources associated with the transmission in the unlicensed band. Alternatively, the information associated with the transmission collision may comprise an indication for occurrence of an inter-system transmission collision of a previous transmission in the unlicensed band.

The device 210 determines (410) occurrence of a failure of the transmission in an unlicensed band. In some example embodiments, the device 210 may determine occurrence of a failure of the transmission if it receives HARQ NACK from the device 220. For example, the device 220 may transmit HARQ NACK to the device 210, if it successfully decodes the SCI but fails to decode the data payload received from the device 210.

Then, the device 210 determines (415) a cause of the failure of the transmission. In some example embodiments, the failure of the transmission may be caused by an intra-system transmission collision in the unlicensed band. For example, the intra-system transmission collision may comprise a transmission collision within a sidelink system. Alternatively, the failure of the transmission may be caused by an inter-system transmission collision in the unlicensed band. For example, the inter-system transmission collision may comprise a transmission collision between a sidelink system and a WiFi system.

In the example embodiments where the information associated with the transmission collision comprises an indication for occurrence of an intra-system transmission collision of a previous transmission in the unlicensed band, the device 210 may determine whether the indication for occurrence of an intra-system transmission collision of a previous transmission is received. Then, the device 210 may determine that the failure of the transmission is caused by the intra-system transmission collision, if it receives the indication for occurrence of the intra-system transmission collision of the previous transmission. Otherwise, the device 210 may determine that the failure of the transmission is caused by the inter-system transmission collision, if it doesn't receive any indication for occurrence of an intra-system transmission collision of the previous transmission.

Alternatively, in the example embodiments where the information associated with the transmission collision comprises a plurality of indications for a plurality of potential intra-system transmission collisions in the unlicensed band, the device 210 may determine the cause of the failure of the transmission based on the determination of the reception of a plurality of indications for a plurality of potential intra-system transmission collisions. For example, the device 210 may determine that the failure of the transmission is caused by the inter-system transmission collision, if it doesn't receive a plurality of indications for a plurality of potential intra-system transmission collisions before the occurrence of the failure of the transmission. In some other example embodiments, the device 210 may receive a plurality of indications for a plurality of potential intra-system transmission collisions before the occurrence of the failure of the transmission. Then, the device 210 may determine whether a transmission collision level of a potential intra-system transmission collision of the plurality of potential intra-system transmission collisions is higher than or equal to a level threshold. The device 210 may determine that the failure of the transmission is caused by the intra-system transmission collision in the unlicensed band, if it determines that the transmission collision level of the potential intra-system transmission collision of the plurality of potential intra-system transmission collisions is higher than or equal to the level threshold. Otherwise, the device 210 may determine that the failure of the transmission is caused by the inter-system transmission collision, if it determines that the transmission collision level is lower than the level threshold.

For example, the device 210 may determine the comparison between the transmission collision level and the level threshold based on a number of the plurality of indications for the plurality of potential intra-system transmission collision or received power of the plurality of indications for the plurality of potential intra-system transmission collision. The transmission collision level may be determined to be higher than or equal to the level threshold, if the number of the plurality of indications for the plurality of potential intra-system transmission collision is higher than or equal to a number threshold, or the received power of the plurality of indications for the plurality of potential intra-system transmission collision is higher than or equal to a power threshold. Otherwise, the transmission collision level may be determined to be lower than the level threshold, if the number of the plurality of indications for the plurality of potential intra-system transmission collision is lower than the number threshold, or the received power of the plurality of indications for the plurality of potential intra-system transmission collision is lower than the power threshold.

Alternatively or in addition, the indication for the potential intra-system transmission collisions in the unlicensed band may comprise a further indication of a number of the further devices that have a potential collision with the device 210 on reserved resources indicated by the SCI, and/or an amount of resources detected to have a potential intra-system transmission collision. If the further indication is an additional transmission collision indication, it may be also configured to be provided only if the number of the further devices that have a potential collision with the device 210 is higher than a certain number threshold and/or the amount of resources detected to have a potential intra-system transmission collision is higher than a certain amount threshold.

Alternatively, in the example embodiments where the information associated with the transmission collision comprises one or more indications of non-preferred resources associated with the unlicensed band, the device 210 may determine the cause of the failure of the transmission based on the determination of the reception of one or more indications of non-preferred resources associated with the unlicensed band. For example, the device 210 may determine that the failure of the transmission is caused by the inter-system transmission collision, if it doesn't receive one or more indications of non-preferred resources. In some other example embodiments, the device 210 may receive one or more indications of non-preferred resources. Then, the device 210 may determine a possibility that an intra-system transmission collision has occurred in the unlicensed band based on the one or more indications of the non-preferred resources. For example, the device 210 may determine the possibility that an intra-system transmission collision has occurred based on time and frequency domain information of the non-preferred resources and the interval/periodicity of those resources.

In some example embodiments, the device 210 may determine that the possibility is higher than or equal to the possibility threshold, if resources for a previous transmission follows a pattern of the non-preferred resources in time and frequency domains. Assuming that the transmissions are periodic, the device 210 may determine that an intra-system transmission collision occurs in the current transmission, if it determines that the previous transmission following the same pattern of the non-preferred resources in time and frequency domains as the current transmission uses the non-preferred resources based on the interval/periodicity information of the transmissions. For example, based on the information, the device 210 may estimate the possibility of transmission collision of the previous transmission is high if the used resources in the previous transmission follow the same pattern of the non-preferred resources in time and frequency domain with the indicated interval/periodicity of those resources. Alternatively or in addition, the device 210 may determine that the failure of the transmission is caused by the intra-system transmission collision, if the possibility is higher than or equal to a possibility threshold. Otherwise, the device 210 may determine that the failure of the transmission is caused by the inter-system transmission collision, if the possibility is lower than the possibility threshold.

Further, in the example embodiments where the possibility is higher than or equal to the possibility threshold, the device 210 may determine the cause of the failure of the transmission further based on a number of the one or more indications of the non-preferred resources and/or an amount of the non-preferred resources. For example, the device 210 may determine that the failure of the transmission is caused by the intra-system transmission collision, if the number of the one or more indications of the non-preferred resources is higher than or equal to a number threshold and/or the amount of the non-preferred resources is higher than or equal to an amount threshold. Otherwise, the device 210 may determine that the failure of the transmission is caused by the inter-system transmission collision, if the number of the one or more indications of the non-preferred resources is lower than the number threshold and/or the amount of the non-preferred resources is lower than the amount threshold.

In the example embodiments where the received information associated with the transmission collision comprises an indication for occurrence of an inter-system transmission collision of a previous transmission, the device 210 may determine that the failure of the transmission is caused by the inter-system transmission collision, if it receives an indication for occurrence of an inter-system transmission collision of a previous transmission.

As shown in FIG. 4, the device 210 adjusts (420) a size of a contention window for a listen-before-talk procedure based on the cause of the failure of the transmission. In some example embodiments, the device 210 may maintain or decrease the size of contention window if it determines that the failure of the transmission is caused by the intra-system transmission collision. In some other example embodiments, the device 210 may increase the size of contention window if it determines that the failure of the transmission is caused by the inter-system transmission collision.

Figure 5:
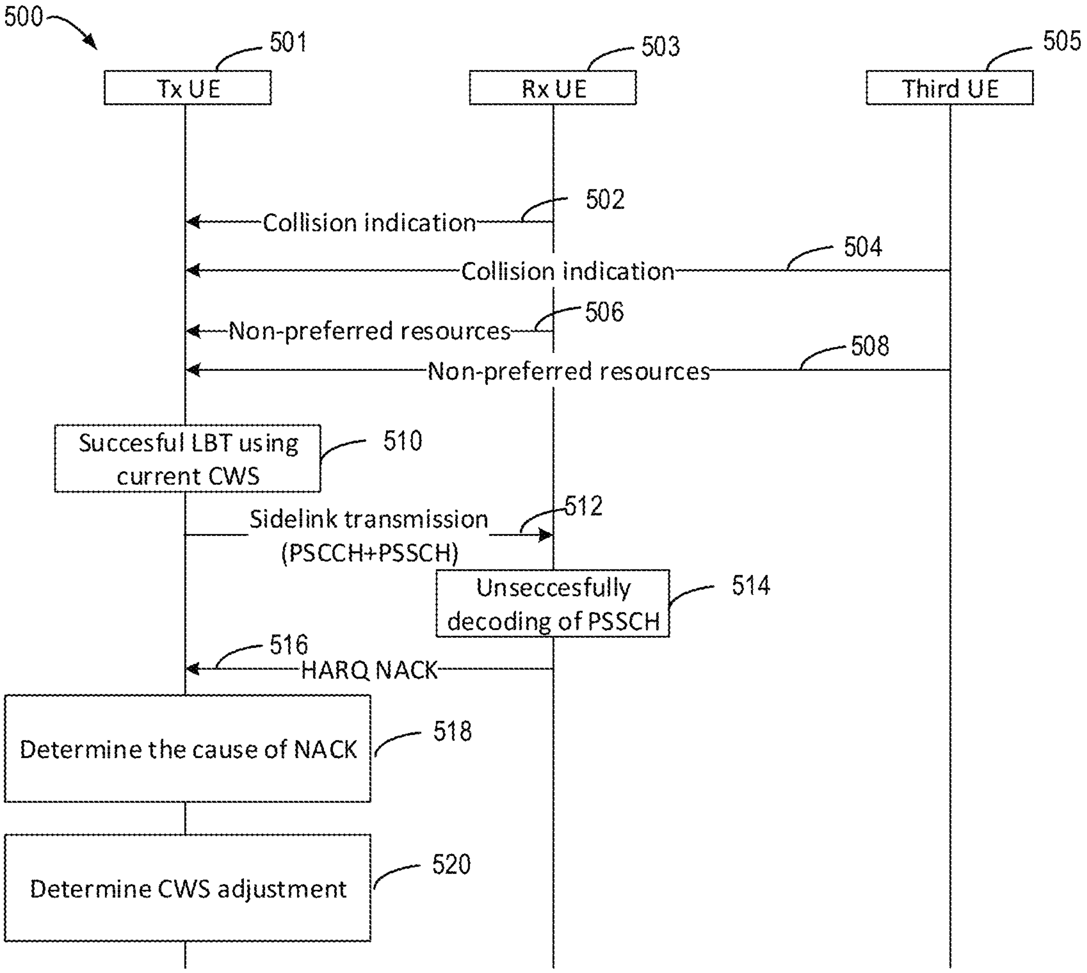
FIG. 5 shows an example process for adjusting CWS according to some example embodiments of the present disclosure.

FIG. 5 shows an example process for adjusting CWS according to some example embodiments of the present disclosure. For the purpose of discussion, the process 500 will be described with reference to FIG. 2. For example, the device 210 may be implements by a Tx UE 501. The device 220 may be implements by a Rx UE 503. The device 230 may be implements by a third UE 505. In this example process, the UEs 501, 503, 505 are in a sidelink system and perform sidelink transmission in an unlicensed band.

As shown in FIG. 5, at 502, the UE 501 receives a collision indication in IUC from the UE 502. At 504, the UE 501 receives a further collision indication in IUC from the UE 503. Further, the UE 501 may receive one or more collision indications in IUC from other UEs in the sidelink system (not shown).

Alternatively, at 506, the UE 501 receives an indication of non-preferred resources associated with the unlicensed band in IUC from the UE 502. At 508, the UE 501 receives a further indication of non-preferred resources associated with the unlicensed band in IUC from the UE 503. Further, the UE 501 may receive one or more indications of non-preferred resources associated with the unlicensed band in IUC from other UEs in the sidelink system (not shown).

Then, at 510, the UE 501 performs successful LBT procedure using the current CWS, thus the UE 501 is allowed to use resources for its transmission. At 512, the UE 501 performs sidelink transmission. The UE 501 transmits control information over the PSCCH and transmits data transmission over the PSSCH to the UE 503. If, at 514, the UE 503 fails to decode the data payload received from the PSSCH, then, at 516, the UE 503 transmits HARQ NACK to the UE 501. Accordingly, the UE 501 may determine occurrence of a failure of the transmission based on the received NACK.

At 518, the UE 501 determines the cause of the failure of the transmission. As an example, if the UE 501 receives an indication for occurrence of an intra-system transmission collision of a previous transmission, it may determine that the HARQ failure of the transmission is caused by the intra-system transmission collision. Otherwise, the UE device 501 may determine that the HARQ failure of the transmission is caused by the inter-system transmission collision, if it doesn't receive any indication for occurrence of the intra-system transmission collision of the previous transmission in the unlicensed band. As another example, if the UE 501 receives one or more indications of non-preferred resources, it may determine a possibility that an intra-system transmission collision has occurred based on the one or more indications of the non-preferred resources. Then, the UE 501 may determine that the HARQ failure of the transmission is caused by the intra-system transmission collision, if the possibility is higher than or equal to a possibility threshold. Otherwise, the UE 501 may determine that the HARQ failure of the transmission is caused by the inter-system transmission collision, if the possibility is lower than the possibility threshold. Some other approaches for determining the cause of the failure of the transmission have been discussed in detail with reference to FIG. 4, and are likewise applicable to the process 500.

Accordingly, at 520, the UE 501 determines CWS adjustment. For example, the UE 501 may maintain or decrease the size of contention window if it determines that the HARQ failure of the transmission is caused by the intra-system transmission collision. The device 210 may increase the size of contention window if it determines that the HARQ failure of the transmission is caused by the inter-system transmission collision.

All operations and features as described above with reference to FIGS. 3-4 are likewise applicable to the process 500 and have similar effects. For the purpose of simplification, the details will be omitted.

Figure 6:
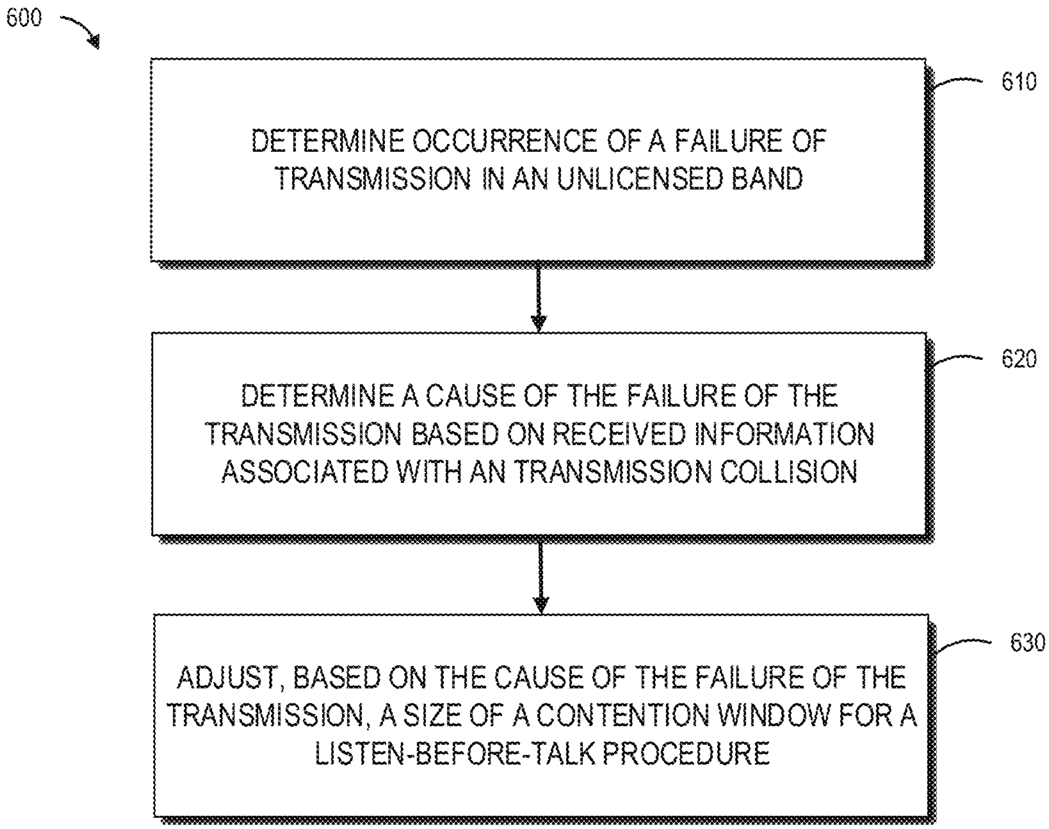
FIG. 6 shows a flowchart of an example method according to some example embodiments of the present disclosure.

FIG. 6 shows a flowchart of an example method 600 according to some example embodiments of the present disclosure. The method 600 can be implemented at the device 210 as shown in FIG. 2. For the purpose of discussion, the method 600 will be described with reference to FIG. 2.

At block 610, the device 210 determines occurrence of a failure of transmission in an unlicensed band. At block 620, the device 210 determines a cause of the failure of the transmission based on received information associated with a transmission collision. Further, at block 630, the device 210 adjusts, based on the cause of the failure of the transmission, a size of a contention window for a listen-before-talk procedure.

In some example embodiments, the device 210 may detect the information associated with the transmission collision.

In some example embodiments, the device 210 may determine that the failure of the transmission is caused by an intra-system transmission collision in the unlicensed band. Further, the device 210 may adjust the size of the contention window by: maintaining or decreasing the size of contention window.

In some example embodiments, the intra-system transmission collision comprises a transmission collision within a sidelink system.

In some example embodiments, the information associated with the transmission collision comprises an indication for occurrence of an intra-system transmission collision of a previous transmission in the unlicensed band, and the device 210 may, in response to receiving the indication for occurrence of the intra-system transmission collision of the previous transmission in the unlicensed band, determine that the failure of the transmission is caused by the intra-system transmission collision in the unlicensed band.

In some example embodiments, the information associated with the transmission collision comprises a plurality of indications for a plurality of potential intra-system transmission collisions in the unlicensed band, and the device 210 may receive the plurality of indications for the plurality of potential intra-system transmission collisions in the unlicensed band before the occurrence of the failure of the transmission. Further, the device 210 may determine whether a transmission collision level of a potential intra-system transmission collision of the plurality of potential intra-system transmission collisions is higher than or equal to a level threshold. Then, the device 210 may, in accordance with a determination that the transmission collision level of the potential intra-system transmission collision of the plurality of potential intra-system transmission collisions is higher than or equal to the level threshold, determine that the failure of the transmission is caused by the intra-system transmission collision in the unlicensed band.

In some example embodiments, the device 210 may, in response to at least one of the following, determine that the transmission collision level of the potential intra-system transmission collision of the plurality of potential intra-system transmission collisions is higher than or equal to the level threshold: a number of the plurality of indications for the plurality of potential intra-system transmission collision higher than or equal to a number threshold: or received power of the plurality of indications for the plurality of potential intra-system transmission collision higher than or equal to a power threshold.

In some example embodiments, the information associated with the transmission collision comprises one or more indications of non-preferred resources associated with the unlicensed band, and the device 210 may receive the one or more indications of the non-preferred resources associated with the unlicensed band. The device 210 may determine, based on the one or more indications of the non-preferred resources, a possibility that an intra-system transmission collision has occurred in the unlicensed band. Further, the device 210 may, in response to the possibility higher than or equal to a possibility threshold, determine that the failure of the transmission is caused by the intra-system transmission collision in the unlicensed band.

In some example embodiments, the device 210 may, in response to the possibility higher than or equal to the possibility threshold, determine that the failure of the transmission is caused by the intra-system transmission collision in the unlicensed band, if: a number of the one or more indications of the non-preferred resources is higher than or equal to a number threshold; and/or an amount of the non-preferred resources is higher than or equal to an amount threshold.

In some example embodiments, the device 210 may, in response to resources for a previous transmission following a pattern of the non-preferred resources in time and frequency domains, determine that the possibility is higher than or equal to the possibility threshold.

In some example embodiments, the device 210 may determine that the failure of the transmission is caused by an inter-system transmission collision in the unlicensed band. Further, the device 210 may increase the size of contention window.

In some example embodiments, the inter-system transmission collision comprises a transmission collision between a sidelink system and a wireless fidelity system.

In some example embodiments, the information associated with the transmission collision comprises one or more indications associated with an intra-system transmission collision in the unlicensed band, and the device 210 may determine whether the one or more indications associated with the intra-system transmission collision in the unlicensed band is received. Further the device 210 may, in response to absence of the one or more indications associated with the intra-system transmission collision in the unlicensed band, determine that the failure of the transmission is caused by the inter-system transmission collision in the unlicensed band.

In some example embodiments, the one or more indications associated with the intra-system transmission collision in the unlicensed band comprise at least one of: an indication for occurrence of an intra-system transmission collision of a previous transmission in the unlicensed band: a plurality of indications for a plurality of potential intra-system transmission collisions in the unlicensed band: or one or more indications of non-preferred resources associated with the unlicensed band.

In some example embodiments, the received information associated with the transmission collision comprises a plurality of indications for a plurality of potential intra-system transmission collisions in the unlicensed band, and the device 210 may, in response to receiving the plurality of indications for the plurality of potential intra-system transmission collisions in the unlicensed band before the occurrence of the failure of the transmission, determine whether a transmission collision level of a potential intra-system transmission collision of the plurality of potential intra-system transmission collisions is lower than a level threshold. Further, the device 210 may, in accordance with a determination that the transmission collision level of the potential intra-system transmission collision of the plurality of potential intra-system transmission collisions is lower than the level threshold, determine that the failure of the transmission is caused by the inter-system transmission collision.

In some example embodiments, the device 210 may, in response to at least one of the following, determine that the transmission collision level of the potential intra-system transmission collision of the plurality of potential intra-system transmission collisions is lower than the level threshold: a number of the plurality of indications for the plurality of potential intra-system transmission collision is lower than a number threshold: or received power of the plurality of indications for the plurality of potential intra-system transmission collision is lower than a power threshold.

In some example embodiments, the received information associated with the transmission collision comprises one or more indications of non-preferred resources associated with the unlicensed band, and the device 210 may, in response to receiving the one or more indications of the non-preferred resources associated with the unlicensed band, determine based on the one or more indications of the non-preferred resources, a possibility that an intra-system transmission collision has occurred in the unlicensed band. Further, the device 210 may, in response to the possibility lower than a possibility threshold, determine that the failure of the transmission is caused by the inter-system transmission collision in the unlicensed band.

In some example embodiments, the device 210 may, in response to the possibility higher than or equal to the possibility threshold, determine that the failure of the transmission is caused by the inter-system transmission collision in the unlicensed band if: a number of the one or more indications of the non-preferred resources is lower than a number threshold; and/or an amount of the non-preferred resources is lower than an amount threshold.

In some example embodiments, the received information associated with the transmission collision comprises an indication for occurrence of a inter-system transmission collision of a previous transmission in the unlicensed band, and the device 210 may, in response to receiving the indication for occurrence of the inter-system transmission collision of the previous transmission in the unlicensed band, determine that the failure of the transmission is caused by the inter-system transmission collision in the unlicensed band.

In some example embodiments, the information associated with the transmission collision comprises sidelink inter-user equipment coordination information.

In some example embodiments, the cause of the failure of the transmission is determined implicitly or explicitly based on the information associated with the transmission collision.

In some example embodiments, the information associated with the transmission collision comprises assistance information for implicitly determining the cause of the failure of the transmission.

In some example embodiments, the information associated with the transmission collision comprises the cause of the failure of the transmission.

In some example embodiments, the transmission comprises sidelink transmission, and wherein the information associated with the transmission collision is received from a receiving device of the sidelink transmission or a further device.

Those skilled in the art can understand that all operations and features as described above with reference to FIGS. 2-5 are likewise applicable to the method 600 and have similar effects.

Figure 7:
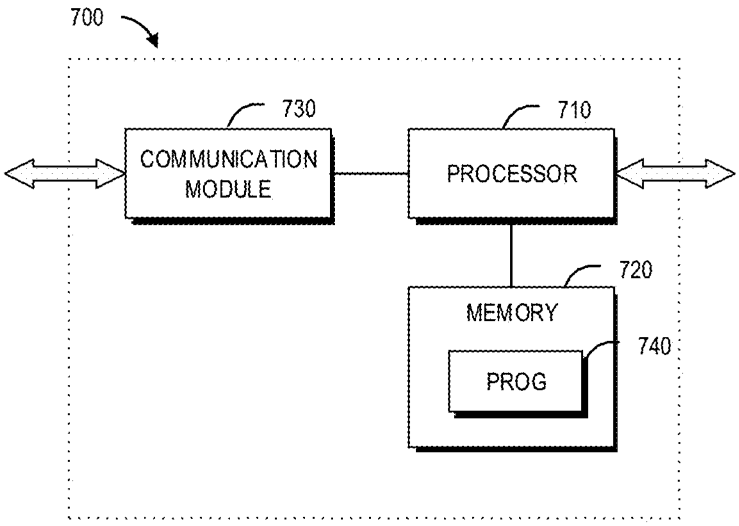
FIG. 7 shows a simplified block diagram of a device that is suitable for implementing example embodiments of the present disclosure.

FIG. 7 is a simplified block diagram of a device 700 that is suitable for implementing example embodiments of the present disclosure. The device 700 can be implemented at or as a part of the device 210 as shown in FIG. 2.

As shown, the device 700 includes a processor 710, a memory 720 coupled to the processor 710, a communication module 730 coupled to the processor 710, and a communication interface (not shown) coupled to the communication module 730. The memory 720 stores at least a program 740. The communication module 730 is for bidirectional communications, for example, via multiple antennas. The communication interface may represent any interface that is necessary for communication.

The program 740 is assumed to include program instructions that, when executed by the associated processor 710, enable the device 700 to operate in accordance with the example embodiments of the present disclosure, as discussed herein with reference to FIGS. 2-6. The example embodiments herein may be implemented by computer software executable by the processor 710 of the device 700, or by hardware, or by a combination of software and hardware. The processor 710 may be configured to implement various example embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

When the device 700 acts as the device 210 or a part of the device 210, the processor 710 and the communication module 730 may cooperate to implement the method 600 as described above with reference to FIGS. 2-5. All operations and features as described above with reference to FIGS. 2-6 are likewise applicable to the device 700 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a first device comprises: at least one processor; and at least one memory including computer program code: the at least one memory and the computer program code configured to, with the at least one processor, cause the first device to: determine occurrence of a failure of transmission in an unlicensed band; determine a cause of the failure of the transmission based on received information associated with a transmission collision; and adjust, based on the cause of the failure of the transmission, a size of a contention window for a listen-before-talk procedure.

In some example embodiments, the device is further caused to: detect the information associated with the transmission collision.

In some example embodiments, the device is caused to determine the cause of the failure of the transmission by: determining that the failure of the transmission is caused by an intra-system transmission collision in the unlicensed band; and the device is caused to adjust the size of the contention window by: maintaining or decreasing the size of contention window.

In some example embodiments, the intra-system transmission collision comprises a transmission collision within a sidelink system.

In some example embodiments, the information associated with the transmission collision comprises an indication for occurrence of an intra-system transmission collision of a previous transmission in the unlicensed band, and the device is caused to determine that the failure of the transmission is caused by the intra-system transmission collision in the unlicensed band by: in response to receiving the indication for occurrence of the intra-system transmission collision of the previous transmission in the unlicensed band, determining that the failure of the transmission is caused by the intra-system transmission collision in the unlicensed band.

In some example embodiments, the information associated with the transmission collision comprises a plurality of indications for a plurality of potential intra-system transmission collisions in the unlicensed band, and the device is caused to determine that the failure of the transmission is caused by the intra-system transmission collision in the unlicensed band by: receiving the plurality of indications for the plurality of potential intra-system transmission collisions in the unlicensed band before the occurrence of the failure of the transmission: determining whether a transmission collision level of a potential intra-system transmission collision of the plurality of potential intra-system transmission collisions is higher than or equal to a level threshold; and in accordance with a determination that the transmission collision level of the potential intra-system transmission collision of the plurality of potential intra-system transmission collisions is higher than or equal to the level threshold, determining that the failure of the transmission is caused by the intra-system transmission collision in the unlicensed band.

In some example embodiments, the device is caused to determine whether the transmission collision level of the potential intra-system transmission collision of the plurality of potential intra-system transmission collisions is higher than or equal to the level threshold by: in response to at least one of the following, determining that the transmission collision level of the potential intra-system transmission collision of the plurality of potential intra-system transmission collisions is higher than or equal to the level threshold: a number of the plurality of indications for the plurality of potential intra-system transmission collision higher than or equal to a number threshold; or received power of the plurality of indications for the plurality of potential intra-system transmission collision higher than or equal to a power threshold.

In some example embodiments, the information associated with the transmission collision comprises one or more indications of non-preferred resources associated with the unlicensed band, and the device is caused to determine that the failure of the transmission is caused by the intra-system transmission collision in the unlicensed band by: receiving the one or more indications of the non-preferred resources associated with the unlicensed band; determining, based on the one or more indications of the non-preferred resources, a possibility that an intra-system transmission collision has occurred in the unlicensed band; and in response to the possibility higher than or equal to a possibility threshold, determining that the failure of the transmission is caused by the intra-system transmission collision in the unlicensed band.

In some example embodiments, the device is caused to determine that the failure of the transmission is caused by the intra-system transmission collision in the unlicensed band by: in response to the possibility higher than or equal to the possibility threshold, determining that the failure of the transmission is caused by the intra-system transmission collision in the unlicensed band, if: a number of the one or more indications of the non-preferred resources is higher than or equal to a number threshold; and/or an amount of the non-preferred resources is higher than or equal to an amount threshold.

In some example embodiments, the device is further caused to, in response to resources for a previous transmission following a pattern of the non-preferred resources in time and frequency domains, determine that the possibility is higher than or equal to the possibility threshold.

In some example embodiments, the device is caused to determine the cause of the failure of the transmission by: determining that the failure of the transmission is caused by an inter-system transmission collision in the unlicensed band; and the device is caused to adjust the size of the contention window by: increasing the size of contention window.

In some example embodiments, the inter-system transmission collision comprises a transmission collision between a sidelink system and a wireless fidelity system.

In some example embodiments, the information associated with the transmission collision comprises one or more indications associated with an intra-system transmission collision in the unlicensed band, and the device is caused to determine that the failure of the transmission is caused by the inter-system transmission collision in the unlicensed band by: determining whether the one or more indications associated with the intra-system transmission collision in the unlicensed band is received; and in response to absence of the one or more indications associated with the intra-system transmission collision in the unlicensed band, determining that the failure of the transmission is caused by the inter-system transmission collision in the unlicensed band.

In some example embodiments, the one or more indications associated with the intra-system transmission collision in the unlicensed band comprise at least one of: an indication for occurrence of an intra-system transmission collision of a previous transmission in the unlicensed band: a plurality of indications for a plurality of potential intra-system transmission collisions in the unlicensed band: or one or more indications of non-preferred resources associated with the unlicensed band.

In some example embodiments, the received information associated with the transmission collision comprises a plurality of indications for a plurality of potential intra-system transmission collisions in the unlicensed band, and the device is caused to determine that the failure of the transmission is caused by the inter-system transmission collision in the unlicensed band by: in response to receiving the plurality of indications for the plurality of potential intra-system transmission collisions in the unlicensed band before the occurrence of the failure of the transmission, determining whether a transmission collision level of a potential intra-system transmission collision of the plurality of potential intra-system transmission collisions is lower than a level threshold; and in accordance with a determination that the transmission collision level of the potential intra-system transmission collision of the plurality of potential intra-system transmission collisions is lower than the level threshold, determining that the failure of the transmission is caused by the inter-system transmission collision.

In some example embodiments, the device is caused to determine whether the transmission collision level of the potential intra-system transmission collision of the plurality of potential intra-system transmission collisions is lower than the level threshold by: in response to at least one of the following, determining that the transmission collision level of the potential intra-system transmission collision of the plurality of potential intra-system transmission collisions is lower than the level threshold: a number of the plurality of indications for the plurality of potential intra-system transmission collision is lower than a number threshold: or received power of the plurality of indications for the plurality of potential intra-system transmission collision is lower than a power threshold.

In some example embodiments, the received information associated with the transmission collision comprises one or more indications of non-preferred resources associated with the unlicensed band, and the device is caused to determine that the failure of the transmission is caused by the inter-system transmission collision in the unlicensed band by: in response to receiving the one or more indications of the non-preferred resources associated with the unlicensed band, determining, based on the one or more indications of the non-preferred resources, a possibility that an intra-system transmission collision has occurred in the unlicensed band; and in response to the possibility lower than a possibility threshold, determining that the failure of the transmission is caused by the inter-system transmission collision in the unlicensed band.

In some example embodiments, the device is caused to determine that the failure of the transmission is caused by the inter-system transmission collision in the unlicensed band by: in response to the possibility higher than or equal to the possibility threshold, determining that the failure of the transmission is caused by the inter-system transmission collision in the unlicensed band if: a number of the one or more indications of the non-preferred resources is lower than a number threshold; and/or an amount of the non-preferred resources is lower than an amount threshold.

In some example embodiments, the received information associated with the transmission collision comprises an indication for occurrence of a inter-system transmission collision of a previous transmission in the unlicensed band, and the device is caused to determine that the failure of the transmission is caused by the inter-system transmission collision in the unlicensed band by: in response to receiving the indication for occurrence of the inter-system transmission collision of the previous transmission in the unlicensed band, determining that the failure of the transmission is caused by the inter-system transmission collision in the unlicensed band.

In some example embodiments, the information associated with the transmission collision comprises sidelink inter-user equipment coordination information.

In some example embodiments, the cause of the failure of the transmission is determined implicitly or explicitly based on the information associated with the transmission collision.

In some example embodiments, the information associated with the transmission collision comprises assistance information for implicitly determining the cause of the failure of the transmission.

In some example embodiments, the information associated with the transmission collision comprises the cause of the failure of the transmission.

In some example embodiments, the transmission comprises sidelink transmission, and wherein the information associated with the transmission collision is received from a receiving device of the sidelink transmission or a further device.

In some aspects, a method comprises: determining occurrence of a failure of transmission in an unlicensed band: determining a cause of the failure of the transmission based on received information associated with a transmission collision; and adjusting, based on the cause of the failure of the transmission, a size of a contention window for a listen-before-talk procedure.

In some example embodiments, the method further comprising: detecting the information associated with the transmission collision.

In some example embodiments, determining the cause of the failure of the transmission comprises: determining that the failure of the transmission is caused by an intra-system transmission collision in the unlicensed band; and adjusting the size of the contention window comprises: maintaining or decreasing the size of contention window.

In some example embodiments, the intra-system transmission collision comprises a transmission collision within a sidelink system.

In some example embodiments, the information associated with the transmission collision comprises an indication for occurrence of an intra-system transmission collision of a previous transmission in the unlicensed band, and determining that the failure of the transmission is caused by the intra-system transmission collision in the unlicensed band comprises: in response to receiving the indication for occurrence of the intra-system transmission collision of the previous transmission in the unlicensed band, determining that the failure of the transmission is caused by the intra-system transmission collision in the unlicensed band.

In some example embodiments, the information associated with the transmission collision comprises a plurality of indications for a plurality of potential intra-system transmission collisions in the unlicensed band, and determining that the failure of the transmission is caused by the intra-system transmission collision in the unlicensed band comprises: receiving the plurality of indications for the plurality of potential intra-system transmission collisions in the unlicensed band before the occurrence of the failure of the transmission: determining whether a transmission collision level of a potential intra-system transmission collision of the plurality of potential intra-system transmission collisions is higher than or equal to a level threshold; and in accordance with a determination that the transmission collision level of the potential intra-system transmission collision of the plurality of potential intra-system transmission collisions is higher than or equal to the level threshold, determining that the failure of the transmission is caused by the intra-system transmission collision in the unlicensed band.

In some example embodiments, determining whether the transmission collision level of the potential intra-system transmission collision of the plurality of potential intra-system transmission collisions is higher than or equal to the level threshold comprises: in response to at least one of the following, determining that the transmission collision level of the potential intra-system transmission collision of the plurality of potential intra-system transmission collisions is higher than or equal to the level threshold: a number of the plurality of indications for the plurality of potential intra-system transmission collision higher than or equal to a number threshold: or received power of the plurality of indications for the plurality of potential intra-system transmission collision higher than or equal to a power threshold.

In some example embodiments, the information associated with the transmission collision comprises one or more indications of non-preferred resources associated with the unlicensed band, and determining that the failure of the transmission is caused by the intra-system transmission collision in the unlicensed band comprises: receiving the one or more indications of the non-preferred resources associated with the unlicensed band; determining, based on the one or more indications of the non-preferred resources, a possibility that an intra-system transmission collision has occurred in the unlicensed band; and in response to the possibility higher than or equal to a possibility threshold, determining that the failure of the transmission is caused by the intra-system transmission collision in the unlicensed band.

In some example embodiments, determining that the failure of the transmission is caused by the intra-system transmission collision in the unlicensed band comprises: in response to the possibility higher than or equal to the possibility threshold, determining that the failure of the transmission is caused by the intra-system transmission collision in the unlicensed band, if: a number of the one or more indications of the non-preferred resources is higher than or equal to a number threshold; and/or an amount of the non-preferred resources is higher than or equal to an amount threshold.

In some example embodiments, the method further comprises: in response to resources for a previous transmission following a pattern of the non-preferred resources in time and frequency domains, determining that the possibility is higher than or equal to the possibility threshold.

In some example embodiments, determining the cause of the failure of the transmission comprises: determining that the failure of the transmission is caused by an inter-system transmission collision in the unlicensed band; and adjusting the size of the contention window comprises: increasing the size of contention window.

In some example embodiments, the inter-system transmission collision comprises a transmission collision between a sidelink system and a wireless fidelity system.

In some example embodiments, the information associated with the transmission collision comprises one or more indications associated with an intra-system transmission collision in the unlicensed band, and determining that the failure of the transmission is caused by the inter-system transmission collision in the unlicensed band comprises: determining whether the one or more indications associated with the intra-system transmission collision in the unlicensed band is received; and in response to absence of the one or more indications associated with the intra-system transmission collision in the unlicensed band, determining that the failure of the transmission is caused by the inter-system transmission collision in the unlicensed band.

In some example embodiments, the one or more indications associated with the intra-system transmission collision in the unlicensed band comprise at least one of: an indication for occurrence of an intra-system transmission collision of a previous transmission in the unlicensed band: a plurality of indications for a plurality of potential intra-system transmission collisions in the unlicensed band: or one or more indications of non-preferred resources associated with the unlicensed band.

In some example embodiments, the received information associated with the transmission collision comprises a plurality of indications for a plurality of potential intra-system transmission collisions in the unlicensed band, and determining that the failure of the transmission is caused by the inter-system transmission collision in the unlicensed band comprises: in response to receiving the plurality of indications for the plurality of potential intra-system transmission collisions in the unlicensed band before the occurrence of the failure of the transmission, determining whether a transmission collision level of a potential intra-system transmission collision of the plurality of potential intra-system transmission collisions is lower than a level threshold; and in accordance with a determination that the transmission collision level of the potential intra-system transmission collision of the plurality of potential intra-system transmission collisions is lower than the level threshold, determining that the failure of the transmission is caused by the inter-system transmission collision.

In some example embodiments, determining whether the transmission collision level of the potential intra-system transmission collision of the plurality of potential intra-system transmission collisions is lower than the level threshold comprises: in response to at least one of the following, determining that the transmission collision level of the potential intra-system transmission collision of the plurality of potential intra-system transmission collisions is lower than the level threshold: a number of the plurality of indications for the plurality of potential intra-system transmission collision is lower than a number threshold: or received power of the plurality of indications for the plurality of potential intra-system transmission collision is lower than a power threshold.

In some example embodiments, the received information associated with the transmission collision comprises one or more indications of non-preferred resources associated with the unlicensed band, and determining that the failure of the transmission is caused by the inter-system transmission collision in the unlicensed band comprises: in response to receiving the one or more indications of the non-preferred resources associated with the unlicensed band, determining, based on the one or more indications of the non-preferred resources, a possibility that an intra-system transmission collision has occurred in the unlicensed band; and in response to the possibility lower than a possibility threshold, determining that the failure of the transmission is caused by the inter-system transmission collision in the unlicensed band.

In some example embodiments, determining that the failure of the transmission is caused by the inter-system transmission collision in the unlicensed band comprises: in response to the possibility higher than or equal to the possibility threshold, determining that the failure of the transmission is caused by the inter-system transmission collision in the unlicensed band if: a number of the one or more indications of the non-preferred resources is lower than a number threshold; and/or an amount of the non-preferred resources is lower than an amount threshold.

In some example embodiments, the received information associated with the transmission collision comprises an indication for occurrence of a inter-system transmission collision of a previous transmission in the unlicensed band, and determining that the failure of the transmission is caused by the inter-system transmission collision in the unlicensed band comprises: in response to receiving the indication for occurrence of the inter-system transmission collision of the previous transmission in the unlicensed band, determining that the failure of the transmission is caused by the inter-system transmission collision in the unlicensed band.

In some example embodiments, the information associated with the transmission collision comprises sidelink inter-user equipment coordination information.

In some example embodiments, the cause of the failure of the transmission is determined implicitly or explicitly based on the information associated with the transmission collision.

In some example embodiments, the information associated with the transmission collision comprises assistance information for implicitly determining the cause of the failure of the transmission.

In some example embodiments, the information associated with the transmission collision comprises the cause of the failure of the transmission.

In some example embodiments, wherein the transmission comprises sidelink transmission, and wherein the information associated with the transmission collision is received from a receiving device of the sidelink transmission or a further device.

In some aspects, an apparatus comprises: means for determining occurrence of a failure of transmission in an unlicensed band; means for determining a cause of the failure of the transmission based on received information associated with a transmission collision; and means for adjusting, based on the cause of the failure of the transmission, a size of a contention window for a listen-before-talk procedure.

In some example embodiments, the apparatus further comprising: means for detecting the information associated with the transmission collision.

In some example embodiments, the means for determining the cause of the failure of the transmission comprises: means for determining that the failure of the transmission is caused by an intra-system transmission collision in the unlicensed band; and the means for adjusting the size of the contention window comprises: means for maintaining or decreasing the size of contention window.

In some example embodiments, the intra-system transmission collision comprises a transmission collision within a sidelink system.

In some example embodiments, the information associated with the transmission collision comprises an indication for occurrence of an intra-system transmission collision of a previous transmission in the unlicensed band, and the means for determining that the failure of the transmission is caused by the intra-system transmission collision in the unlicensed band comprises: means for, in response to receiving the indication for occurrence of the intra-system transmission collision of the previous transmission in the unlicensed band, determining that the failure of the transmission is caused by the intra-system transmission collision in the unlicensed band.

In some example embodiments, the information associated with the transmission collision comprises a plurality of indications for a plurality of potential intra-system transmission collisions in the unlicensed band, and the means for determining that the failure of the transmission is caused by the intra-system transmission collision in the unlicensed band comprises: means for receiving the plurality of indications for the plurality of potential intra-system transmission collisions in the unlicensed band before the occurrence of the failure of the transmission: means for determining whether a transmission collision level of a potential intra-system transmission collision of the plurality of potential intra-system transmission collisions is higher than or equal to a level threshold; and means for, in accordance with a determination that the transmission collision level of the potential intra-system transmission collision of the plurality of potential intra-system transmission collisions is higher than or equal to the level threshold, determining that the failure of the transmission is caused by the intra-system transmission collision in the unlicensed band.

In some example embodiments, the means for determining whether the transmission collision level of the potential intra-system transmission collision of the plurality of potential intra-system transmission collisions is higher than or equal to the level threshold comprises: means for in response to at least one of the following, determining that the transmission collision level of the potential intra-system transmission collision of the plurality of potential intra-system transmission collisions is higher than or equal to the level threshold: a number of the plurality of indications for the plurality of potential intra-system transmission collision higher than or equal to a number threshold: or received power of the plurality of indications for the plurality of potential intra-system transmission collision higher than or equal to a power threshold.

In some example embodiments, the information associated with the transmission collision comprises one or more indications of non-preferred resources associated with the unlicensed band, and the means for determining that the failure of the transmission is caused by the intra-system transmission collision in the unlicensed band comprises: means for receiving the one or more indications of the non-preferred resources associated with the unlicensed band: determining, based on the one or more indications of the non-preferred resources, a possibility that an intra-system transmission collision has occurred in the unlicensed band; and means for, in response to the possibility higher than or equal to a possibility threshold, determining that the failure of the transmission is caused by the intra-system transmission collision in the unlicensed band.

In some example embodiments, the means for determining that the failure of the transmission is caused by the intra-system transmission collision in the unlicensed band comprises: means for, in response to the possibility higher than or equal to the possibility threshold, determining that the failure of the transmission is caused by the intra-system transmission collision in the unlicensed band, if: a number of the one or more indications of the non-preferred resources is higher than or equal to a number threshold; and/or an amount of the non-preferred resources is higher than or equal to an amount threshold.

In some example embodiments, the apparatus further comprises: means for, in response to resources for a previous transmission following a pattern of the non-preferred resources in time and frequency domains, determining that the possibility is higher than or equal to the possibility threshold.

In some example embodiments, the means for determining the cause of the failure of the transmission comprises: means for determining that the failure of the transmission is caused by an inter-system transmission collision in the unlicensed band; and adjusting the size of the contention window comprises: increasing the size of contention window.

In some example embodiments, the inter-system transmission collision comprises a transmission collision between a sidelink system and a wireless fidelity system.

In some example embodiments, the information associated with the transmission collision comprises one or more indications associated with an intra-system transmission collision in the unlicensed band, and the means for determining that the failure of the transmission is caused by the inter-system transmission collision in the unlicensed band comprises: means for determining whether the one or more indications associated with the intra-system transmission collision in the unlicensed band is received; and means for, in response to absence of the one or more indications associated with the intra-system transmission collision in the unlicensed band, determining that the failure of the transmission is caused by the inter-system transmission collision in the unlicensed band.

In some example embodiments, the one or more indications associated with the intra-system transmission collision in the unlicensed band comprise at least one of: an indication for occurrence of an intra-system transmission collision of a previous transmission in the unlicensed band; a plurality of indications for a plurality of potential intra-system transmission collisions in the unlicensed band; or one or more indications of non-preferred resources associated with the unlicensed band.

In some example embodiments, the received information associated with the transmission collision comprises a plurality of indications for a plurality of potential intra-system transmission collisions in the unlicensed band, and the means for determining that the failure of the transmission is caused by the inter-system transmission collision in the unlicensed band comprises: means for, in response to receiving the plurality of indications for the plurality of potential intra-system transmission collisions in the unlicensed band before the occurrence of the failure of the transmission, determining whether a transmission collision level of a potential intra-system transmission collision of the plurality of potential intra-system transmission collisions is lower than a level threshold; and means for, in accordance with a determination that the transmission collision level of the potential intra-system transmission collision of the plurality of potential intra-system transmission collisions is lower than the level threshold, determining that the failure of the transmission is caused by the inter-system transmission collision.

In some example embodiments, the means for determining whether the transmission collision level of the potential intra-system transmission collision of the plurality of potential intra-system transmission collisions is lower than the level threshold comprises: means for, in response to at least one of the following, determining that the transmission collision level of the potential intra-system transmission collision of the plurality of potential intra-system transmission collisions is lower than the level threshold: a number of the plurality of indications for the plurality of potential intra-system transmission collision is lower than a number threshold: or received power of the plurality of indications for the plurality of potential intra-system transmission collision is lower than a power threshold.

In some example embodiments, the received information associated with the transmission collision comprises one or more indications of non-preferred resources associated with the unlicensed band, and the means for determining that the failure of the transmission is caused by the inter-system transmission collision in the unlicensed band comprises: means for, in response to receiving the one or more indications of the non-preferred resources associated with the unlicensed band, determining, based on the one or more indications of the non-preferred resources, a possibility that an intra-system transmission collision has occurred in the unlicensed band; and means for, in response to the possibility lower than a possibility threshold, determining that the failure of the transmission is caused by the inter-system transmission collision in the unlicensed band.

In some example embodiments, the means for determining that the failure of the transmission is caused by the inter-system transmission collision in the unlicensed band comprises: means for, in response to the possibility higher than or equal to the possibility threshold, determining that the failure of the transmission is caused by the inter-system transmission collision in the unlicensed band if: a number of the one or more indications of the non-preferred resources is lower than a number threshold; and/or an amount of the non-preferred resources is lower than an amount threshold.

In some example embodiments, the received information associated with the transmission collision comprises an indication for occurrence of a inter-system transmission collision of a previous transmission in the unlicensed band, and the means for determining that the failure of the transmission is caused by the inter-system transmission collision in the unlicensed band comprises: means for, in response to receiving the indication for occurrence of the inter-system transmission collision of the previous transmission in the unlicensed band, determining that the failure of the transmission is caused by the inter-system transmission collision in the unlicensed band.

In some example embodiments, the information associated with the transmission collision comprises sidelink inter-user equipment coordination information.

In some example embodiments, the cause of the failure of the transmission is determined implicitly or explicitly based on the information associated with the transmission collision.

In some example embodiments, the information associated with the transmission collision comprises assistance information for implicitly determining the cause of the failure of the transmission.

In some example embodiments, the information associated with the transmission collision comprises the cause of the failure of the transmission.

In some example embodiments, wherein the transmission comprises sidelink transmission, and wherein the information associated with the transmission collision is received from a receiving device of the sidelink transmission or a further device.

In some aspects, a computer readable storage medium comprises program instructions stored thereon, the instructions, when executed by a processor of a device, causing the device to perform the method according to some example embodiments of the present disclosure.

We claim:

1. A device comprising:

a processor; and a non-transitory computer-readable medium comprising computer-executable instructions that, when executed by the processor, cause the processor to perform the following operations:

determine occurrence of a failure of transmission in an unlicensed band;

determine a cause of the failure of the transmission based on received information associated with a transmission collision, wherein the information associated with the transmission collision comprises a plurality of indications for a plurality of potential intra-system transmission collisions in the unlicensed band, and wherein the computer-executable instructions further cause the processor to determine that the failure of the transmission is caused by an intra-system transmission collision in the unlicensed band by:

receiving the plurality of indications for the plurality of potential intra-system transmission collisions in the unlicensed band before the occurrence of the failure of the transmission, wherein the plurality of indications associated with the intra-system transmission collision in the unlicensed band comprise: an indication for occurrence of an intra-system transmission collision of a previous transmission in the unlicensed band, a plurality of indications for a plurality of potential intra-system transmission collisions in the unlicensed band, and one or more indications of non-preferred resources associated with the unlicensed band;

determining whether a transmission collision level of a potential intra-system transmission collision of the plurality of potential intra-system transmission collisions is higher than or equal to a level threshold by:

in response to the following:

determining that the transmission collision level of the potential intra-system transmission collision of the plurality of potential intra-system transmission collisions is higher than or equal to the level threshold;

a number of the plurality of indications for the plurality of potential intra-system transmission collision higher than or equal to a number threshold; and the received power of the plurality of indications for the plurality of potential intra-system transmission collision is higher than or equal to a power threshold; and in accordance with a determination that the transmission collision level of the potential intra-system transmission collision of the plurality of potential intra-system transmission collisions is higher than or equal to the level threshold, determining that the failure of the transmission is caused by the intra-system transmission collision in the unlicensed band, wherein the device is caused to determine that the failure of the transmission is caused by the intra-system transmission collision in the unlicensed band by:

receiving the one or more indications of the non-preferred resources associated with the unlicensed band;

determining, based on the one or more indications of the non-preferred resources, a possibility that an intra-system transmission collision has occurred in the unlicensed band;

in response to the possibility being higher than or equal to a possibility threshold, determining that the failure of the transmission is caused by the intra-system transmission collision in the unlicensed band based on a number of the plurality of indications of the non-preferred resources is higher than or equal to a number threshold, and an amount of the non-preferred resources is higher than or equal to an amount threshold; and adjust, based on the cause of the failure of the transmission, a size of a contention window for a listen-before-talk procedure.

2. The device of claim 1, wherein the computer-executable instructions further cause the processor to detect the information associated with the transmission collision.

3. The device of claim 2, wherein the intra-system transmission collision comprises a transmission collision within a sidelink system.

4. The device of claim 3, wherein the computer-executable instructions further cause the processor to: in response to resources for a previous transmission following a pattern of the non-preferred resources in time and frequency domains, determining that the possibility is higher than or equal to the possibility threshold.

5. The device of claim 4, wherein the computer-executable instructions further cause the processor to adjust the size of the contention window by increasing the size of contention window.

6. The device of claim 1, wherein the information associated with the transmission collision comprises sidelink inter-user equipment coordination information.

7. The device of claim 6, wherein the cause of the failure of the transmission is determined implicitly or explicitly based on the information associated with the transmission collision.

8. A system comprising:

a device;

a processor; and a non-transitory computer-readable medium comprising computer-executable instructions that, when executed by the processor, cause the processor to perform the following operations:

determine occurrence of a failure of transmission in an unlicensed band;

determine a cause of the failure of the transmission based on received information associated with a transmission collision, wherein the information associated with the transmission collision comprises a plurality of indications for a plurality of potential intra-system transmission collisions in the unlicensed band, and wherein the computer-executable instructions further cause the processor to determine that the failure of the transmission is caused by an intra-system transmission collision in the unlicensed band by:

receiving the plurality of indications for the plurality of potential intra-system transmission collisions in the unlicensed band before the occurrence of the failure of the transmission, wherein the plurality of indications associated with the intra-system transmission collision in the unlicensed band comprise: an indication for occurrence of an intra-system transmission collision of a previous transmission in the unlicensed band, a plurality of indications for a plurality of potential intra-system transmission collisions in the unlicensed band, and one or more indications of non-preferred resources associated with the unlicensed band;

determining whether a transmission collision level of a potential intra-system transmission collision of the plurality of potential intra-system transmission collisions is higher than or equal to a level threshold by:

in response to the following:

determining that the transmission collision level of the potential intra-system transmission collision of the plurality of potential intra-system transmission collisions is higher than or equal to the level threshold;

a number of the plurality of indications for the plurality of potential intra-system transmission collision higher than or equal to a number threshold; and the received power of the plurality of indications for the plurality of potential intra-system transmission collision is higher than or equal to a power threshold; and in accordance with a determination that the transmission collision level of the potential intra-system transmission collision of the plurality of potential intra-system transmission collisions is higher than or equal to the level threshold, determining that the failure of the transmission is caused by the intra-system transmission collision in the unlicensed band, wherein the device is caused to determine that the failure of the transmission is caused by the intra-system transmission collision in the unlicensed band by:

receiving the one or more indications of the non-preferred resources associated with the unlicensed band;

determining, based on the one or more indications of the non-preferred resources, a possibility that an intra-system transmission collision has occurred in the unlicensed band;

in response to the possibility being higher than or equal to a possibility threshold, determining that the failure of the transmission is caused by the intra-system transmission collision in the unlicensed band based on a number of the plurality of indications of the non-preferred resources is higher than or equal to a number threshold, and an amount of the non-preferred resources is higher than or equal to an amount threshold; and adjust, based on the cause of the failure of the transmission, a size of a contention window for a listen-before-talk procedure.

9. The system of claim 8, wherein the computer-executable instructions further cause the processor to detect the information associated with the transmission collision.

10. The system of claim 9, wherein the intra-system transmission collision comprises a transmission collision within a sidelink system.

11. The system of claim 10, wherein the computer-executable instructions further cause the processor to: in response to resources for a previous transmission following a pattern of the non-preferred resources in time and frequency domains, determining that the possibility is higher than or equal to the possibility threshold.

12. The system of claim 11, wherein the computer-executable instructions further cause the processor to adjust the size of the contention window by increasing the size of contention window.

13. The system of claim 8, wherein the information associated with the transmission collision comprises sidelink inter-user equipment coordination information.

14. The system of claim 13, wherein the cause of the failure of the transmission is determined implicitly or explicitly based on the information associated with the transmission collision.

15. A method comprising:

determining occurrence of a failure of transmission in an unlicensed band;

determining a cause of the failure of the transmission based on received information associated with a transmission collision, wherein the information associated with the transmission collision comprises a plurality of indications for a plurality of potential intra-system transmission collisions in the unlicensed band, and wherein the computer-executable instructions further cause the processor to determine that the failure of the transmission is caused by an intra-system transmission collision in the unlicensed band by:

receiving the plurality of indications for the plurality of potential intra-system transmission collisions in the unlicensed band before the occurrence of the failure of the transmission, wherein the plurality of indications associated with the intra-system transmission collision in the unlicensed band comprise: an indication for occurrence of an intra-system transmission collision of a previous transmission in the unlicensed band, a plurality of indications for a plurality of potential intra-system transmission collisions in the unlicensed band, and one or more indications of non-preferred resources associated with the unlicensed band;

determining whether a transmission collision level of a potential intra-system transmission collision of the plurality of potential intra-system transmission collisions is higher than or equal to a level threshold by:

in response to the following:

determining that the transmission collision level of the potential intra-system transmission collision of the plurality of potential intra-system transmission collisions is higher than or equal to the level threshold;

a number of the plurality of indications for the plurality of potential intra-system transmission collision higher than or equal to a number threshold; and the received power of the plurality of indications for the plurality of potential intra-system transmission collision is higher than or equal to a power threshold; and in accordance with a determination that the transmission collision level of the potential intra-system transmission collision of the plurality of potential intra-system transmission collisions is higher than or equal to the level threshold, determining that the failure of the transmission is caused by the intra-system transmission collision in the unlicensed band, wherein the device is caused to determine that the failure of the transmission is caused by the intra-system transmission collision in the unlicensed band by:

receiving the one or more indications of the non-preferred resources associated with the unlicensed band;

determining, based on the one or more indications of the non-preferred resources, a possibility that an intra-system transmission collision has occurred in the unlicensed band;

in response to the possibility being higher than or equal to a possibility threshold, determining that the failure of the transmission is caused by the intra-system transmission collision in the unlicensed band based on a number of the plurality of indications of the non-preferred resources is higher than or equal to a number threshold, and an amount of the non-preferred resources is higher than or equal to an amount threshold; and adjusting, based on the cause of the failure of the transmission, a size of a contention window for a listen-before-talk procedure.

16. The method of claim 15, further comprising detecting the information associated with the transmission collision.

17. The method of claim 16, wherein the intra-system transmission collision comprises a transmission collision within a sidelink system.

18. The method of claim 17, further comprising: in response to resources for a previous transmission following a pattern of the non-preferred resources in time and frequency domains, determining that the possibility is higher than or equal to the possibility threshold.

19. The method of claim 18, further comprising adjusting the size of the contention window by increasing the size of contention window.

20. The method of claim 19, wherein the information associated with the transmission collision further comprises sidelink inter-user equipment coordination information.

* * * * *